United States Patent [19]

Mizuhara et al.

[11] Patent Number: 4,785,989

[45] Date of Patent: Nov. 22, 1988

[54] CLAD SYSTEM FOR BRAZING TO ALUMINA

[75] Inventors: Howard Mizuhara, Hillsborough; Eugene Huebel, Union City, both of Calif.

[73] Assignee: GTE Products Corporation, Stamford, Conn.

[21] Appl. No.: 121,205

[22] Filed: Nov. 16, 1987

[51] Int. Cl.$^4$ .................... B23K 31/02; B23K 35/22
[52] U.S. Cl. ............................... 228/122; 228/124; 228/208; 228/215; 228/249; 228/263.12
[58] Field of Search .............. 228/122, 124, 193–195, 228/208, 215, 249, 254, 255, 263.12

[56] References Cited

U.S. PATENT DOCUMENTS

| | | | |
|---|---|---|---|
| 3,055,465 | 9/1962 | Pulfrich | 228/122 |
| 3,454,374 | 7/1969 | Domin | 228/249 |
| 3,736,649 | 6/1973 | Bristow | 228/122 |
| 4,024,629 | 5/1977 | Lemoine et al. | 29/852 |
| 4,562,121 | 12/1985 | Thiemann et al. | 228/263.12 |
| 4,598,025 | 7/1986 | Mizuhara | 228/122 |
| 4,711,386 | 12/1987 | Mizuhara | 228/122 |

*Primary Examiner*—Nicholas P. Godici
*Assistant Examiner*—Samuel M. Heinrich
*Attorney, Agent, or Firm*—James Theodosopoulos

[57] ABSTRACT

Alumina is bonded to a metal by means of an active brazing filler alloy. When the metal to which the alumina is bonded is a high blushing metal, that is, a metal on which the active brazing filler alloy readily flows on the surface, a thin layer of a low blushing metal is disposed therebetween.

4 Claims, No Drawings

CLAD SYSTEM FOR BRAZING TO ALUMINA

This invention is concerned with the brazing of alumina ceramic to a metal or ceramic part. Such a braze requires an active filler metal, as is known, and as is disclosed in, for example, U.S. Pat. Nos. 4,643,875, 4,623,513 and 4,448,605. It is also known that a layer of a cushioning or ductile metal should be provided between the alumina and the part to which it is to be brazed, if there is a mismatch of coefficients of thermal expansion, in order to absorb stresses. Such a cushioning layer is disclosed in U.S. Pat. No. 4,562,121.

It can occur that the cushioning metal used for stress relief is one on which the active brazing filler metal blushes, that is to say, the active brazing filler metal flows on the surface of the cushioning metal. When such blushing occurs, it leaves very little of the active element, usually titanium, in the filler metal to wet the ceramic when the ceramic material reaches the brazing temperature. One way to alleviate this situation is to use a thicker layer of the active brazing filler metal. However, since an expensive metal, usually silver, is often a major constituent of the active brazing filler alloy, this solution can be undesirably expensive.

This invention is concerned with another solution to the blushing problem. In this invention, the cushioning metal layer is covered with a thin layer of a low blushing metal on which the active brazing filler metal does not readily flow.

This invention can also apply to a situation where, instead of a cushioning metal layer, the alumina ceramic is to be joined to a metal having about the same coefficient of expansion as the alumina, for example Alloy 42 (42% Ni, 58% Fe); alumina is $8 \times 10^{-6}$ per °C., while Alloy 42 is $10 \times 10^{-6}$ per °C.

In the case where the active brazing filler alloy comprised silver, copper and titanium or silver, copper, titanium and indium, I have found a satisfactory low blushing metal to be 410 or 430 stainless steel.

EXAMPLE 1

A 0.40" 410 Stainless is placed on both faces of 0.420" thickness Alloy 42 and the combination rolled down to 50 mil overall thickness. The composite consists of a 4 mil 410 Stainless Steel skin, 42 mil Alloy 42 and a 4 mil 410 Stainless Steel skin.

The 410 Stainless Steel-alloy 42 composite is placed between 1.2"×1.2"×0.100" AL-995 alumina substrates with 3 mil silver-copper-titanium alloy (sold under trade name of Cusil ABA and manufactured by WESGO, Division of GTE Products Corp.) on both sides of the composite. The assembly with 100 gram steel load is placed in a vacuum furnace and brazed at 840° C. under $10^{-5}$ Torr vacuum. An excellent bonded system is produced.

EXAMPLE 2

Two AL-995 alumina ceramic tubes, 1" outside diameter with 0.75" inside diameter are joined by placing a 1" diameter circular disc by 10 mil thickness 410 Stainless Steel clad Alloy 42 between the tubes. Two preforms of Incusil ABA with a dimension of 1" O.D. by 0.75" I.D. by 2 mils thickness is placed on either side of the clad metal. The assembly is brazed at 750° C. under $10^{-5}$ Torr vacuum. The joint showed excellent braze and He gas mass spectograph leak checked to better than $10^{-9}$ cc/sec. leak rate. Incusil ABA is WESGO's trade name for a silver-copper-indium-titanium alloy.

EXAMPLE 3

Same test as Example 2 in all details except the clad metal was replaced by 10 mil 42 metal preform. The brazed sample showed that the filler metal flowed over the Alloy 42 leaving very little fillet. The joint showed a leak rate of about $10^{-6}$ cc/sec. which is unacceptable.

EXAMPLE 4

Same test as Example 3, except a 4 mil thickness Incusil ABA preform was used. The result showed that 4 mil thickness preform resulted with a hermetic joint measuring better than $10^{-9}$ cc/sec. He leak rate. However, the brazed sample showed excessive blushing.

In summary, the invention comprises a clad system of a relatively thick metal layer, on which an active brazing filler metal blushes, covered with a thinner layer of a metal on which the active brazing filler metal blushes little or none. The relatively thick metal layer can be a cushioning metal, such as molybdenum or Kovar (Kovar is a trade name of Westinghouse Co. for an alloy of FeNiCo), or a metal selected for having a coefficient of thermal expansion close to that of alumina, such as Alloy 42. The low blushing metal can be 410 or 430 Stainless Steel.

I claim:

1. The method of bonding alumina to a cushioning metal which is high blushing to an active brazing filler metal comprising the steps of: roll bonding a thin layer of a lower blushing metal to a thicker layer of the cushioning metal and rolling the combination to a predetermined thickness; disposing a thin layer of an active brazing filler metal between the lower blushing metal and the alumina; and melting the active brazing filler metal to bond the alumina to the cushioning metal.

2. The method of claim 1 wherein the active brazing filler metal comprises a silver-copper-titanium alloy or a silver-copper-titanium-indium alloy.

3. The method of bonding alumina to a metal having a closely matching coefficient of thermal expansion and which is high blushing to an active brazing filler metal comprising the steps of: roll bonding a thin layer of a lower blushing metal to a thickner layer of the matching coefficient metal and rolling the combination to a predetermined thickness; disposing a thin layer of an active brazing filler metal between the lower blushing metal and the alumina, and melting the active brazing filler metal to bond the alumina to the matching coefficient metal.

4. The method of claim 3 wherein the active brazing filler metal comprises a silver-copper-titanium alloy or a silver-copper-titanium-indium alloy.

* * * * *